United States Patent
Åström et al.

(10) Patent No.: US 10,079,398 B2
(45) Date of Patent: Sep. 18, 2018

(54) TRANSITION ARRANGEMENT AND PROCESS OF A FUEL CELL SYSTEM OPERATION STATE

(71) Applicant: CONVION OY, Espoo (FI)

(72) Inventors: Kim Åström, Kirkkonummi (FI); Tuomas Hakala, Helsinki (FI); Matias Halinen, Helsinki (FI)

(73) Assignee: CONVION OY, Espoo (FI)

( * ) Notice: Subject to any disclaimer, the term of this patent is extended or adjusted under 35 U.S.C. 154(b) by 0 days.

(21) Appl. No.: 15/333,560

(22) Filed: Oct. 25, 2016

(65) Prior Publication Data

US 2017/0040628 A1    Feb. 9, 2017

Related U.S. Application Data

(63) Continuation of application No. PCT/FI2014/050301, filed on Apr. 25, 2014.

(51) Int. Cl.
*H01M 8/04791* (2016.01)
*H01M 8/04302* (2016.01)
(Continued)

(52) U.S. Cl.
CPC ... *H01M 8/04798* (2013.01); *H01M 8/04097* (2013.01); *H01M 8/04223* (2013.01);
(Continued)

(58) Field of Classification Search
CPC ......... H01M 8/04791; H01M 8/04089; H01M 8/04223; H01M 8/0432; H01M 8/0612;
(Continued)

(56) References Cited

U.S. PATENT DOCUMENTS 8,658,323 B2   2/2014  Fujimura et al.
9,406,949 B2   8/2016  Takeuchi et al.
(Continued)

FOREIGN PATENT DOCUMENTS

JP   2008-282599 A   11/2008
JP   2009-099264 A    5/2009
(Continued)

OTHER PUBLICATIONS

JP2014010944 MT.*
(Continued)

*Primary Examiner* — Alex Usyatinsky
(74) *Attorney, Agent, or Firm* — Buchanan Ingersoll & Rooney PC

(57) ABSTRACT

A start-up transition process is disclosed for a fuel cell system operation state, which includes utilization of predefined first and second temperature limits for the fuel cells, specifying a low temperature operating state of cells below the first limit, at which presence of carbonaceous species at the cells is precluded, a transition temperature range of cells above the first and below the second limit at which fuel flow supply is initiated to the fuel system in a mixture with air, combined with anode tail gas recirculated at a recirculation rate over 70, and an intermediate temperature operating state of the cells above the second temperature limit, at which free oxygen at the anodes.

12 Claims, 4 Drawing Sheets

(51) Int. Cl.
*H01M 8/04303* (2016.01)
*H01M 8/2432* (2016.01)
*H01M 8/243* (2016.01)
*H01M 8/0612* (2016.01)
*H01M 8/04089* (2016.01)
*H01M 8/04223* (2016.01)
*H01M 8/04701* (2016.01)
*H01M 8/0432* (2016.01)
*H01M 8/124* (2016.01)

(52) U.S. Cl.
CPC ... *H01M 8/04302* (2016.02); *H01M 8/04303* (2016.02); *H01M 8/04373* (2013.01); *H01M 8/04731* (2013.01); *H01M 8/0618* (2013.01); *H01M 8/243* (2013.01); *H01M 8/2432* (2016.02); *H01M 2008/1293* (2013.01)

(58) Field of Classification Search
CPC ........... H01M 8/0618; H01M 8/04097; H01M 8/04731; H01M 8/04798; H01M 8/04373; H01M 2008/1293
See application file for complete search history.

(56) References Cited

U.S. PATENT DOCUMENTS

| | | | |
|---|---|---|---|
| 2002/0102443 A1* | 8/2002 | Yang | H01M 8/04097 429/415 |
| 2005/0181247 A1* | 8/2005 | Foger | H01M 8/04014 429/425 |
| 2006/0093879 A1 | 5/2006 | Yang et al. | |
| 2009/0104484 A1 | 4/2009 | Fujimura et al. | |
| 2011/0159386 A1* | 6/2011 | Kaupert | H01M 8/04223 429/423 |
| 2012/0064422 A1 | 3/2012 | Takeuchi et al. | |
| 2012/0214076 A1* | 8/2012 | Hakala | H01M 8/04097 429/427 |
| 2014/0087279 A1 | 3/2014 | Kiyohiro | |
| 2015/0221961 A1 | 8/2015 | Takeuchi et al. | |

FOREIGN PATENT DOCUMENTS

| | | |
|---|---|---|
| JP | 2010-067534 A | 3/2010 |
| JP | 2011-034715 A | 2/2011 |
| JP | 2014-010944 A | 1/2014 |
| WO | WO 2013/117810 A1 | 8/2013 |

OTHER PUBLICATIONS

International Search Report (PCT/ISA/210) dated Dec. 22, 2014, by the European Patent Office as the International Searching Authority for International Application No. PCT/FI2014/050301.

International Preliminary Report on Patentability (PCT/IPEA/409) dated Apr. 5, 2016 for International Application No. PCT/FI2014/050301.

* cited by examiner

TRANSITION ARRANGEMENT AND PROCESS OF A FUEL CELL SYSTEM OPERATION STATE

RELATED APPLICATION

This application claims priority as a continuation application under 35 U.S.C. § 120 to PCT/FI2014/050301 filed as an International application on Apr. 25, 2014 designating the U.S., the entire content of which is hereby incorporated by reference in its entirety.

FIELD

Most of the energy of the world is produced by oil, coal, natural gas or nuclear power. All these production methods have specific issues as far as, for example, availability and friendliness to environment are concerned. As far as the environment is concerned, especially oil and coal cause pollution when they are combusted. Nuclear power involves, at least, storage of used fuel. Especially because of the environmental issues, new energy sources, more environmentally friendly and, for example, having a better efficiency than the abovementioned energy sources, have been developed.

Fuel cells, by which energy of fuel, for example biogas, is directly converted to electricity via a chemical reaction in an environmentally friendly process, are promising future energy conversion devices.

BACKGROUND INFORMATION

A fuel cell, as presented in FIG. 1, includes an anode side 100 and a cathode side 102 and an electrolyte material 104 between them. In solid oxide fuel cells (SOFCs) oxygen 106 is fed to the cathode side 102 and it is reduced to a negative oxygen ion by receiving electrons from the cathode. The negative oxygen ion goes through the electrolyte material 104 to the anode side 100 where it reacts with fuel 108 producing water and also for example, carbon dioxide (CO2). Between anode 100 and cathode 102 is an external electric circuit 111 having a load 110 for the fuel cell.

FIG. 2 shows a SOFC device as an example of a high temperature fuel cell device. A SOFC device can utilize as fuel for example natural gas, bio gas, methanol or other compounds containing hydrocarbons or pure hydrogen. A SOFC device in FIG. 2 can include more than one, for example, plural fuel cells in stack formation 103 (SOFC stack). Each fuel cell includes an anode 100 and cathode 102 structure as presented in FIG. 1. Part of the used fuel can be recirculated in feedback arrangement 109 through each anode. A SOFC device in FIG. 2 also includes fuel heat exchanger 105 and reformer 107. Several heat exchangers can be used for controlling thermal conditions at different locations in a fuel cell process. Reformer 107 is a device that converts the fuel such as for example natural gas to a composition suitable for fuel cells, for example to a composition containing hydrogen and methane, carbon dioxide, carbon monoxide and inert gases. However, in each SOFC device it is not necessary to have a reformer.

By using measurement means 115 (such as fuel flow meter, current meter and/or temperature meter) desired and/or necessary measurements are carried out for the operation of the SOFC device. A fraction of the gas used at anodes 100 may be recirculated through anodes in feedback arrangement 109 and the other part of the gas is exhausted 114 from the anodes 100.

A solid oxide fuel cell (SOFC) device is an electrochemical conversion device that produces electricity directly by oxidizing fuel. A SOFC device can provide high efficiencies, long term stability, low emissions, and reduced cost. However, such devices can have high operating temperature which results in long start up and shutdown times and in both mechanical and chemical compatibility issues.

Natural gases such as methane and gases containing higher carbon compounds have been used as fuels in SOFCs, which gases, however, have to be pre-processed before feeding to the fuel cells to prevent coking (i.e., formation of harmful carbon compounds such as for example coke, fly dust, tar, carbonate and carbide compounds). These different forms of carbon can be in this context referenced to as generally being harmful carbon compounds. Hydrocarbons go through a thermal or catalytic decomposition in the formation of harmful carbon compounds. The produced compound can adhere to the surfaces of the fuel cell device and adsorbs on catalysts, such as nickel particles. The harmful carbon compound produced in the coking coats some of the active surface of the fuel cell device, thus significantly deteriorating the reactivity of the fuel cell process. The harmful carbon compounds may even completely block the fuel passage.

Preventing formation of harmful carbon compounds can, therefore, be important for ensuring a long service life for the fuel cells. The prevention of formation of harmful carbon compounds also saves catalysts that are the substances (nickel, platinum, etc.) used in fuel cells for accelerating chemical reactions. Gas pre-processing requires water, which is supplied to the fuel cell device. Water produced by combining oxygen ions and fuel (i.e., the gas on the anode 100 side), can also be used in the pre-processing of the gas.

The anode electrode of solid oxide fuel cell (SOFC) can contain significant amounts of nickel that is vulnerable to form nickel oxide if the atmosphere is not reducing. If nickel oxide formation is severe, the morphology of electrode material may change irreversibly causing significant loss of electrochemical activity or even break-down of cells. Hence, SOFC systems require protective atmosphere, such as gas containing reductive agents during the start-up and shutdown in order to prevent the fuel cell's anode electrodes from oxidizing. In practical systems the amount of purge gas has to be minimized due to cost and storage space reasons. Purge gases are not necessarily elemental and they can be also compound gases.

Known processing of SR (Steam reforming) in fuel cell systems produces carbon dioxide CO2 and hydrogen H2 and excess steam. Requirements for fuel cell system start-up or shutdown operation includes sufficient steam and hydrogen production, and a SR process can be used when an external water supply or water container is available, as well as a related purification system, evaporator, water supply equipment and other equipment required to generate the start-up steam. Required peripherals used for start-up steam generation increase the system cost and decrease reliability due to increased complexity. In larger systems the methodology can include recirculation of part of the anode exhaust back to the reformer inlet to recover steam generated in the fuel cell reactions to be used in the steam reforming process, thus reducing or eliminating the need for continuous external water feed. However, when load is not applied to the fuel cells, such as during start-up, shutdown or idling, steam formation at the fuel cells does not occur.

Processing of CPOx (Catalytic Partial Oxidation) in fuel cell systems traditionally produces carbonmono-oxide CO and hydrogen H2. Requirements for fuel cell system start-up or shutdown operation includes sufficient steam and hydrogen production, where CO production in a larger amount is harmful. Using higher air (i.e., oxygen) amounts for more complete oxidation produces too much heat making temperature rise excessive in the start-up situation or cooling process too slow in the shutdown situation.

Processing of OSR (Oxygen-Steam reforming) in fuel cell systems is a combination of both CPOx and SR (Steam Reforming), where both air and steam are supplied to the reformer and are known to produce carbon dioxide $CO_2$ and hydrogen $H_2$ and excess steam. Requirements for fuel cell system start-up or shutdown operation includes sufficient steam and hydrogen production, and an OSR process can be used when an external water supply or water container is available for SR, as well as a related purification system, evaporator, water supply equipment and other equipment required to generate the start-up steam, and a supply of air or other source of free oxygen is available for CPOx. Required peripherals used for start-up steam generation increase the system cost and decrease reliability due to increased complexity.

CPOx (Catalytic Partial Oxidation) can produce carbon monoxide CO and hydrogen $H_2$. This gas mixture is used for various chemical industry purposes, and the operating temperature of CPOx is above 700° C. The known product gas is unsuitable for fuel cell due to coke formation in the system heating/operating temperatures. Requirements for start-up or shutdown gas include sufficient steam and hydrogen production, whereas CO production in larger amount is harmful. Using higher air (i.e., oxygen) amounts for more complete oxidation, produces too much heat making the temperature rise excessive in regards to normal SOFC operating conditions, thermal management, thermal stresses and material selection. A method to increase the amount of oxidation without excessive temperature rise is to perform partial oxidation in multiple stages with intermediate cooling prior to feed of additional oxygen. Such arrangements increase the cost and complexity of systems.

Known documents relating to this technical field include patent application document US 2011/159386 A1 which discloses a process for starting up a fuel cell system, which has a fuel cell with a cathode side and an anode side, a reformer and an auxiliary burner. Fuel cell air is preheated with the auxiliary burner and fed to the cathode side of the fuel cell. Residual gas is circulated from the anode side of the fuel cell to the reformer and from the reformer to the anode side. In this publication, the reformer is heated by overstoichiometric combustion of fuel (burner operating phase) whereby the reformer outlet gas is bypassed from the anodes. This includes costly flow diverting under high (~900° C.) temperature. During the burner operating phase anode circulation is not active. Furthermore, the document discloses that reformer operation is temporarily started when anodes are below 250° C., which poses a risk of forming hazardous nickel carbonyl compounds. US2011159386 does not present an operating mode in which air to fuel ratio is over 0.55 and temperature management of the reforming reaction is handled by recirculation. Hence, the embodiments of US2011159386 do not present a solution to provide safe operating conditions to fuel cells in all conditions while limiting the temperature rise in the reformer with minimum amount of system complexity.

Patent application document US2006093879 A1 discloses a procedure for starting up a fuel cell system having an anode exhaust recycle loop. The fuel cell system is disconnected from its primary load and has air in both its cathode side and anode side. A major part of gas from recirculation of the anode side flow is exhausted and only a small limited flow of hydrogen is provided into the anode side recirculation. Hydrogen and oxygen in the fuel and air mixture are catalytically reacted as they recirculate in the anode side until substantially no oxygen remains in the recycle loop; and then the fuel flow rate into the anode side flow is increased to normal operating levels and thereafter connecting the primary load across the cell. Embodiments presented in US 2006/093879 A1 are for a reforming stage of the fuel cell system, and the in this document discloses a system intended to remove oxygen from the anode side. Hydrogen and water steam have to be fed to the anode side, instead of production of them.

Patent application US 2002/102443 A1 discloses a procedure for shutting down a fuel cell system having an anode exhaust recycle loop. In the embodiments of US2002102443 a resistive load is connected in parallel with the fuel cell to limit the voltage and to react residual hydrogen. This approach in a SOFC would cause irreversible anode oxidation due to fuel shortage. A portion of the anode side flow exhaust is recirculated through the anode side in a recycle loop during operation. The fuel cell system is shut down by disconnecting the primary load from the external circuit and thereafter stopping the flow of fresh hydrogen containing fuel into the anode side flow and catalytically reacting hydrogen in the anode side recirculation by recirculating such gases within the anode recycle loop into contact with a catalyst until substantially all the hydrogen is removed. Thus US 2002/102443 A1 presents a similar but reversed method to that presented in the document US 2006/093879 A1.

Patent application document WO 2013/117810 discloses an arrangement utilizing recirculation for high temperature fuel cell system. In the embodiments of WO2013/117810 catalytic partial oxidation in the recirculation flow disclosed to produce a partially oxidized start-up gas with a substantially low amount of carbon monoxide for the recirculation flow in fuel cell system start-up or shutdown situations by exhausting 30% or less of the entire flow from the anode outlet flow. The embodiments of WO2013/117810 are restricted to catalytic partial oxidation operation, and suffer from rather strict requirements on operation conditions. The generated inert gas contains a potentially insufficient amount of hydrogen due to high lambda values. Also, due to high lambda values, heat control of the reformer requires active cooling and/or very high recirculation rates. WO2013/117810 does not present a procedure according to which safe operation with respect to carbonyl formation in start-up and shutdown can be achieved without risk of anode oxidation.

SUMMARY

A method for start-up transition of a fuel cell system operation state is disclosed, in which system each fuel cell includes an anode side, a cathode side, and an electrolyte between the anode side, the method comprising: performing a recirculation in a recirculation loop containing at least the fuel cell anodes and a catalytic element upstream of the fuel cells; specifying predefined first and second temperature limits for the fuel cells, with a low temperature operating state of cells being below the first limit at which presence of carbonaceous species at the cells is precluded, a transition temperature range of cells above the first limits and below the second limit at which fuel flow supply is initiated to the fuel cell system in a mixture with air, combined with anode tail gas recirculated at a recirculation rate over 70%, the recirculation being at least partly supported by ejector facilitated repressurization operations, and an intermediate temperature operating state of the cells above the second temperature limit at which free oxygen at the anodes is precluded; bringing a temperature of the cells in the system to the transition temperature range to facilitate transitions between low and intermediate temperature operating states through the transition temperature range; facilitating and safeguarding reaction between fuel and free oxygen supplied at the catalytic element whenever fuel is supplied; and controlling an oxygen to carbon ratio of fluid at the anode sides of cells based on predefined temperature dependent boundary values by adjustment of an air to fuel ratio $\lambda$ of feed stocks above $0.55*\lambda$ at the transition temperature range and controlling the $\lambda$ of the feed stocks based on temperature information in the intermediate temperature range and further reducing $\lambda$ of the feed stocks when a loading is applied to the fuel cells to compensate for oxygen influx through the cells to the anode sides of the cells and to control fuel utilization.

A method for shutdown transition process of a fuel cell system operation state, is also disclosed in which system each fuel cell includes an anode side, a cathode side, and an electrolyte between the anode side and the cathode side, the method comprising: performing a recirculation loop containing at least the fuel cell anodes and a catalytic element upstream of the fuel cells; specifying predefined first and second temperature limits for the fuel cells, with a low temperature operating state of cells below the first limit at which presence of carbonaceous species at the cells is precluded, a transition temperature range of cells above the first limit and below the second limit, at which fuel supply to the fuel cell system is terminated in a mixture with air, combined with anode tail gas recirculated at a recirculation rate over 70%, the recirculation being at least partly supported by ejector facilitated repressurization operations, and an intermediate temperature operating state of the cells above the second temperature limit at which free oxygen at the anodes is precluded; facilitating and safeguarding a reaction between fuel and free oxygen supplied at the catalytic element whenever fuel is supplied; bringing a temperature of the cells in the system to the transition temperature range to facilitate transitions between low and intermediate temperature operating states through the transition temperature range; and controlling an oxygen to carbon ratio of fluid at the anode sides of cells based on predefined temperature dependent boundary values by adjustment of an air to fuel ratio $\lambda$ of feed stocks above $0.55*\lambda$ at the transition temperature range, and controlling the $\lambda$ of feed stocks based on temperature information in the intermediate temperature range and further increasing $\lambda$ of feed stocks when fuel cell loading is decreased to compensate for oxygen influx through the cells to the anode sides of the cells and to control fuel utilization.

A fuel cell system is also disclosed, comprising: at least one fuel cell wherein each fuel cell includes an anode side, a cathode side, and an electrolyte between the anode side; a catalytic element for performing catalytic reactions; means for performing a recirculation in a recirculation loop containing at least the fuel cell anode sides and the catalytic element upstream of the fuel cells; means for specifying first and second temperature limits for the fuel cells, with a low temperature operating state of cell being below the first limit at which presence of carbonaceous species at the cells is precluded, a transition temperature range of cell being above the first limit and below the second limit at which fuel flow supply is initiated to the fuel cell system in a mixture with air, combined with anode tail gas recirculated at a recirculation rate over 70%, and an intermediate temperature operating state of the cells being above the second temperature limit, at which operation state free oxygen at the anodes is precluded; at least one ejector for performing repressurization operations in the recirculation loop in order to facilitate the recirculation; means for facilitating and safeguarding reaction between fuel and free oxygen supplied at the catalytic element whenever fuel is supplied; means for bringing a temperature of cells in the system to the transition temperature range to facilitate transitions between low and intermediate temperature operating states through the transition temperature range; and means for controlling an oxygen to carbon ratio of fluid at the anode sides of cells based on predefined temperature dependent boundary values by adjustment of air to fuel ratio $\lambda$ of feed stocks above $0.55*\lambda$ at the transition temperature range, and controlling the $\lambda$ of feed stocks based on temperature information in the intermediate temperature range and further reducing $\lambda$ when loading is applied to the fuel cells to compensate for oxygen influx through the cells to the anode sides of the cells and to control fuel utilization.

A fuel cell system is also disclosed, comprising: at least one fuel cell wherein each fuel cell includes an anode side, a cathode side, and an electrolyte between the anode side and the cathode side; a catalytic element for performing catalytic reactions; means for performing a recirculation in a recirculation loop containing at least the fuel cell anode sides and the catalytic element upstream of the fuel cells; means for specifying first and second temperature limits for the fuel cells, with a low temperature operating state of cells being below the first limit at which presence of carbonaceous species at the cells is precluded, a transition temperature range of cells being above the first and below the second limit, at which is terminated fuel supply to the fuel cell system in a mixture with air, combined with anode tail gas recirculated at a recirculation rate over 70%, and an intermediate temperature operating state of the cells being above the second temperature limit at which operation state free oxygen at the anodes is precluded; at least one ejector for performing repressurization operations in the recirculation loop in order to facilitate the recirculation; means for facilitating and safeguarding reaction between fuel and free oxygen supplied at the catalytic element whenever fuel is supplied; means for bringing temperature of the cells in the system to the transition temperature range to facilitate transitions between low and intermediate temperature operating states through the transition temperature range; and means for controlling an oxygen to carbon ratio of fluid at the anode sides of cells based on predefined temperature dependent boundary values by adjustment of air to fuel ratio $\lambda$ of feed stocks above $0.55*\lambda$ at the transition temperature range, and controlling the $\lambda$ of feed stocks based on temperature information in the intermediate temperature range and further increasing $\lambda$ of feed stocks when fuel cell loading is decreased to compensate for oxygen influx through the cells to the anode sides of the cells and to control fuel utilization.

BRIEF DESCRIPTION OF THE DRAWINGS

Other features and advantages of the present disclosure will become apparent to those skilled in the art upon reading the detailed description of the embodiments in conjunction with the accompanying drawings, wherein.

DETAILED DESCRIPTION

Figure 1:
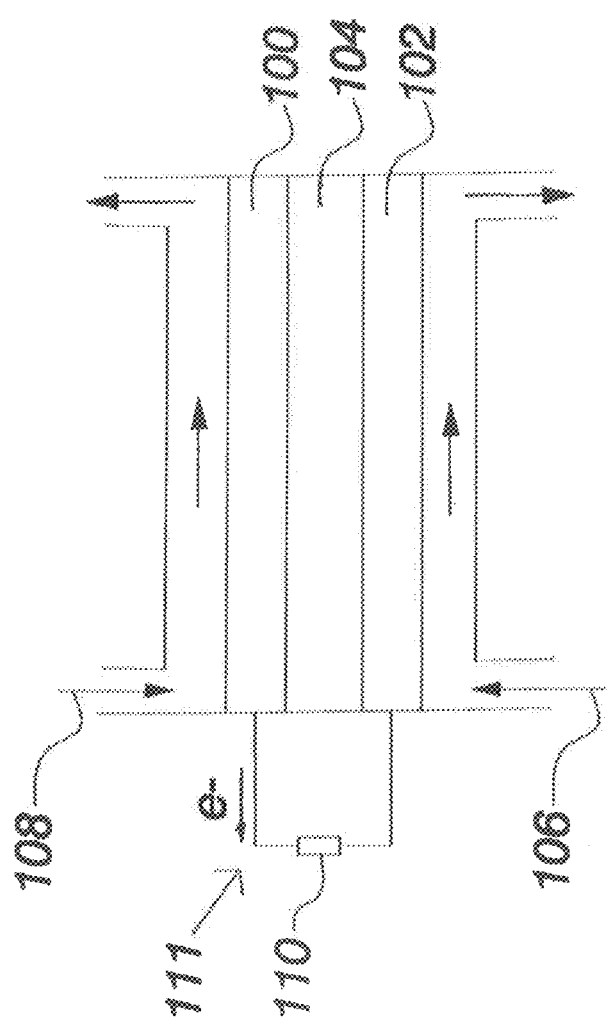
FIG. 1 shows an exemplary single fuel cell structure.

A system and related system state transition procedure that minimizes the amount of components and complexity overhead relating to system start-up and shutdown, could eliminate the need for auxiliary water feed, feed of special start-up/shutdown gases and other equipment associated with the primary function of serving start-up and shut-down.

Accordingly, a fuel cell system is disclosed, where need to use purge gas and external water feed is minimized or even completely eliminated in start-up and shut-down situations of a fuel cell system by an advanced process and arrangement providing practical and wide operation conditions. This is achieved by a start-up transition process of a fuel cell system operation state, in which system each fuel cell includes an anode side, a cathode side, and an electrolyte between the anode side and the cathode side, and in the process recirculation is performed in a recirculation loop containing at least the fuel cell anodes and a catalytic element upstream of the fuel cells. The start-up transition process uses predefined first and second temperature limits for the fuel cells and the process includes specifying a low temperature operating state of cells below the first limit, at which presence of carbonaceous species at the cells is precluded, a transition temperature range of cells above the first and below the second limit, at which is initiated fuel flow supply to the fuel system in a mixture with air, combined with anode tail gas recirculated at a recirculation rate over 70%, and an intermediate temperature operating state of the cells above the second temperature limit, at which free oxygen at the anodes is precluded, bringing temperature of the cells in the system to a transition temperature range to facilitate transitions between low and intermediate temperature operating states through the transition temperature range, facilitating and safeguarding reaction between fuel and free oxygen supplied at the catalytic element whenever fuel is supplied, and control of oxygen to a carbon ratio of fluid at the anode sides of cells based on predefined temperature dependent boundary values by adjustment of an air to fuel ratio λ of feed stocks above 0.55λ at a transition temperature range and controlling the λ of the feed stocks based on temperature information in the intermediate temperature range and further reducing λ of the feed stocks when loading is applied to the fuel cells to compensate for oxygen influx through the cells to the anode sides of the cells and to control fuel utilization.

A shutdown transition process of a fuel cell system operation state is also disclosed in which system each fuel cell includes an anode side, a cathode side, and an electrolyte between the anode side and the cathode side, and in the process a recirculation in a recirculation loop is performed containing at least the fuel cell anodes and a catalytic element upstream of the fuel cells. In the shutdown transition process predefined first and second temperature limits are used for the fuel cells, and the process includes specifying a low temperature operating state of cells below the first limit, at which presence of carbonaceous species at the cells is precluded, a transition temperature range of cells above the first and below the second limit, at which is terminated fuel supply to the fuel system in a mixture with air, combined with anode tail gas recirculated at a recirculation rate over 70%, and an intermediate temperature operating state of the cells above the second temperature limit, at which free oxygen at the anodes is precluded, facilitating and safeguarding reaction between fuel and free oxygen supplied at the catalytic element whenever fuel is supplied, bringing temperature of the cells in the system to a transition temperature range to facilitate transitions between low and intermediate temperature operating states through the transition temperature range, and control of oxygen to carbon ratio of fluid at the anode sides of cells based on predefined temperature dependent boundary values by adjustment of air to fuel ratio λ of feed stocks above 0.55λ at transition temperature range and controlling the λ of feed stocks based on temperature information in the intermediate temperature range and further increasing λ of feed stocks when fuel cell loading is decreased to compensate for oxygen influx through the cells to the anode sides of the cells and to control fuel utilization.

A fuel cell system is disclosed, in which each fuel cell includes an anode side, a cathode side, and an electrolyte between the anode side and the cathode side, the fuel cell system having a catalytic element for performing catalytic reactions, and means for performing a recirculation in a recirculation loop containing at least the fuel cell anode sides and the catalytic element upstream of the fuel cells. The fuel cell system includes means for specifying (e.g., predefinition of) a first and a second temperature limit for the fuel cells, specifying a low temperature operating state of cells below the first limit, at which presence of carbonaceous species at the cells is precluded, specifying a transition temperature range of cells above the first and below the second limit, at which is initiated fuel flow supply to the fuel system in a mixture with air, combined with anode tail gas recirculated at a recirculation rate over 70%, and specifying an intermediate temperature operating state of the cells above the second temperature limit, at which operation state free oxygen at the anodes is precluded, and the fuel cell system includes for start-up transition process means for facilitating and safeguarding reaction between fuel and free oxygen supplied at the catalytic element whenever fuel is supplied, means for bringing temperature of the cells in the system to transition temperature range to facilitate transitions between low and intermediate temperature operating states through the transition temperature range, and means for controlling of oxygen to carbon ratio of fluid at the anode sides of cells based on predefined temperature dependent boundary values by adjustment of air to fuel ratio λ of feed stocks above 0.55λ at transition temperature range and controlling the λ of feed stocks based on temperature information in the intermediate temperature range and further reducing λ when loading is applied to the fuel cells to compensate for oxygen influx through the cells to the anode sides of the cells and to control fuel utilization.

A fuel cell system is disclosed, in which each fuel cell includes an anode side, a cathode side, and an electrolyte between the anode side and the cathode side, the fuel cell system having a catalytic element for performing catalytic reactions, and means for performing a recirculation in a recirculation loop containing at least the fuel cell anode sides and the catalytic element upstream of the fuel cells. The fuel cell system includes means for specifying (e.g., predefinition of) a first and a second temperature limit for the fuel cells, specifying a low temperature operating state of cells below the first limit, at which presence of carbonaceous species at the cells is precluded, specifying a transition temperature range of cells above the first and below the second limit, at which is terminated fuel supply to the fuel system in a mixture with air, combined with anode tail gas recirculated at a recirculation rate over 70%, and specifying an intermediate temperature operating state of the cells above the second temperature limit, at which operation state free oxygen at the anodes is precluded, and the fuel cell system comprises for shutdown transition process means for facilitating and safeguarding reaction between fuel and free oxygen supplied at the catalytic element whenever fuel is supplied, means for bringing temperature of the cells in the system to transition temperature range to facilitate transitions between low and intermediate temperature operating states through the transition temperature range, and means for controlling of oxygen to carbon ratio of fluid at the anode sides of cells based on predefined temperature dependent boundary values by adjustment of air to fuel ratio λ of feed stocks above 0.55λ at transition temperature range and controlling the λ of feed stocks based on temperature information in the intermediate temperature range and further increasing λ of feed stocks when fuel cell loading is decreased to compensate for oxygen influx through the cells to the anode sides of the cells and to control fuel utilization.

Exemplary embodiments can specify low temperature operating state of cells below a first temperature limit, at which presence of carbonaceous species at the cells is precluded, and specify (e.g., predefinition of) a transition temperature range of cells above the first and below a second limit, within which transition temperature range fuel flow may be supplied in a mixture with air to the fuel system. The fuel flow is carried by anode tail gas recirculated at a recirculation rate over 70%. Exemplary embodiments can specify (e.g., predefinition of) an intermediate temperature operating state of the cells above the second temperature limit, at which intermediate temperature operating state free oxygen at the cells is precluded, and on facilitating and safeguarding reaction between fuel and free oxygen supplied at a catalytic element when operating above the first temperature limit. In the transition process is facilitated transitions between low and intermediate temperature operating states through the transition temperature range. Oxygen to carbon ratio of fluid at the anode sides of cells is controlled based on predefined temperature dependent boundary values by adjusting air to fuel ratio λ of feed stocks above 0.55λ at transition temperature range and at intermediate temperature operating state and below 0.55λ upon transition to loading of cells.

Start-ups and shutdowns of exemplary fuel cell systems disclosed herein can be performed without any external purge gases required and without water, which brings significant cost and space savings and installation benefits. Disclosed embodiments can include reduced complexity for removing heat from the anode circulation to prevent over temperatures and to facilitate shut-down can be significantly reduced or even eliminated. Exemplary embodiments can be implemented in a rather wide variety of operating conditions thus not restricting optimization of other functional fuel cell process characteristics and system unit characteristics.

Solid oxide fuel cells (SOFCs) can have multiple geometries. The planar geometry (FIG. 1) is a known sandwich type geometry employed by most types of fuel cells, where the electrolyte 104 is sandwiched in between the electrodes, anode 100 and cathode 102. SOFCs can also be made in tubular geometries where for example either air or fuel is passed through the inside of the tube and the other gas is passed along the outside of the tube. This can be also arranged so that the gas used as fuel is passed through the inside of the tube and air is passed along the outside of the tube. Other geometries of SOFCs include modified planar cells (MPC or MPSOFC), where a wave-like structure replaces the traditional flat configuration of the planar cell. Such designs are promising, because they share the advantages of both planar cells (low resistance) and tubular cells.

The ceramics used in SOFCs do not become ionically active until they reach a very high temperature and as a consequence of this the stacks have to be operated at exemplary temperatures ranging from 600 to 1,000° C. Reduction of oxygen 106 (FIG. 1) into oxygen ions occurs at the cathode 102. These ions can then be transferred through the solid oxide electrolyte 104 to the anode 100 where they can electrochemically oxidize the gas used as fuel 108. In this reaction, water and carbon dioxide by-products are given off as well as two electrons. These electrons then flow through an external circuit 111 where they can be utilized. The cycle then repeats as those electrons enter the cathode material 102 again.

Figure 2:
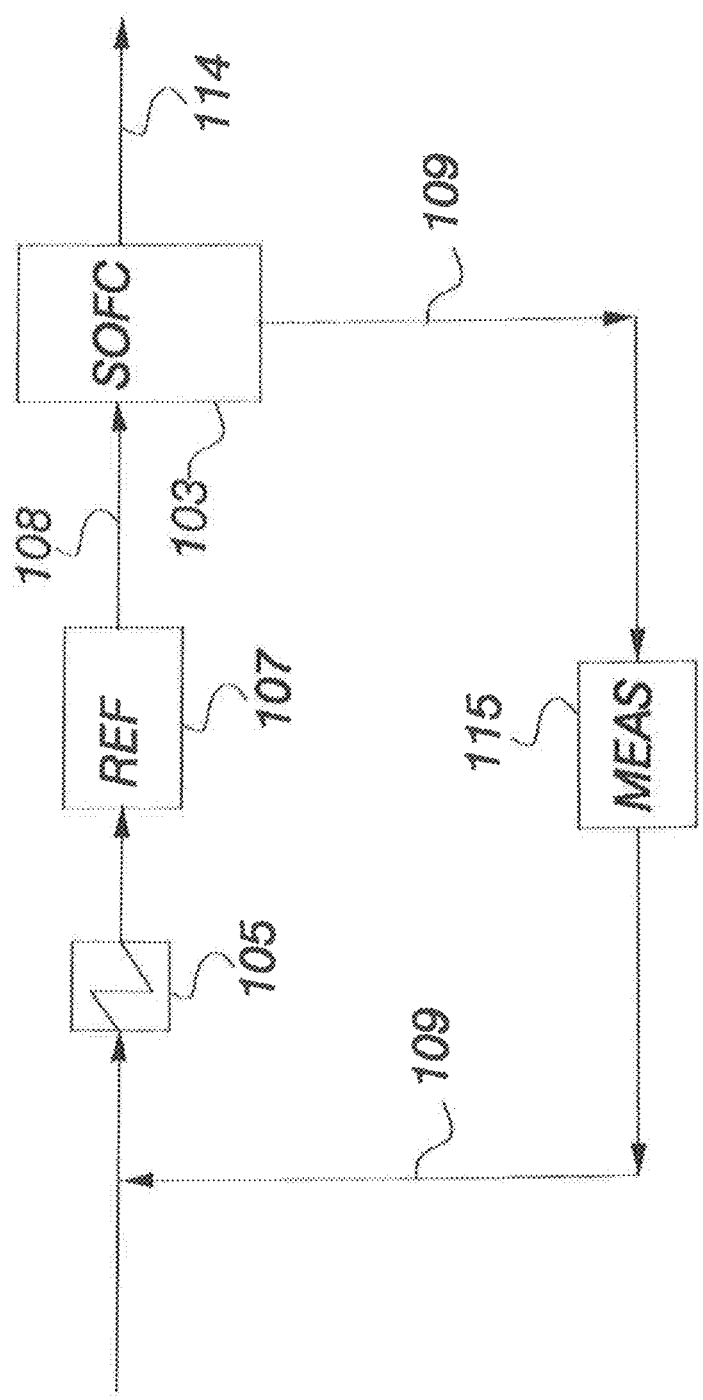
FIG. 2 shows an exemplary SOFC device.

In large solid oxide fuel cell systems known fuels are natural gas (mainly methane), different biogases (mainly methane diluted by nitrogen and/or carbon dioxide), and other higher hydrocarbon containing fuels, including alcohols. Methane and higher hydrocarbons need to be reformed either in the reformer 107 (FIG. 2) before entering the fuel cell stacks 103 or (partially) internally within the stacks 103. The reforming reactions require certain amount of water or other oxygen containing compounds, and additional water or other oxygen containing compounds are also needed to prevent possible carbon formation (i.e., coking) caused, for example, by higher hydrocarbons or other carbon-containing compounds. This water or other oxygen containing compounds can be provided internally by circulating the anode gas exhaust flow, because water or other oxygen containing compounds is produced in excess amounts in fuel cell reactions, and/or said water or other oxygen containing compounds can be provided with an auxiliary feed of water or other oxygen containing compounds (e.g. direct fresh water feed or circulation of exhaust condensate). By anode recirculation arrangement also part of the unused fuel and diluents in anode gas are fed back to the process, whereas in auxiliary water feed arrangement only additive to the process is water. Because an anode electrode of a solid oxide fuel cell can include (e.g., consist of) a porous, nickel matrix ceramic-metallic structure whose morphology can be critical for cell performance, oxidation of nickel may change the fuel cells performance irreversibly. This is why SOFC systems require protective atmosphere, such as gas-containing reductive agents, in order to prevent anode electrodes of the fuel cell system from oxidation. Known start-up and particularly shutdown oxidation protection is accomplished by feeding purge gas (e.g., safety gas containing reductive agents), such as hydrogen for example, diluted with inert gas such as nitrogen. In practical fuel cell systems it is uneconomical to maintain excessive purge gas storage (e.g., the amount of purge gas should be minimized). A fuel cell installation may include means for producing purge gas on-site or use externally produced purge gas, such as stored on-site in pressurized gas bottles. Both approaches have a significant effect on the physical size as well as on the cost of the fuel cell installation.

Figure 3:
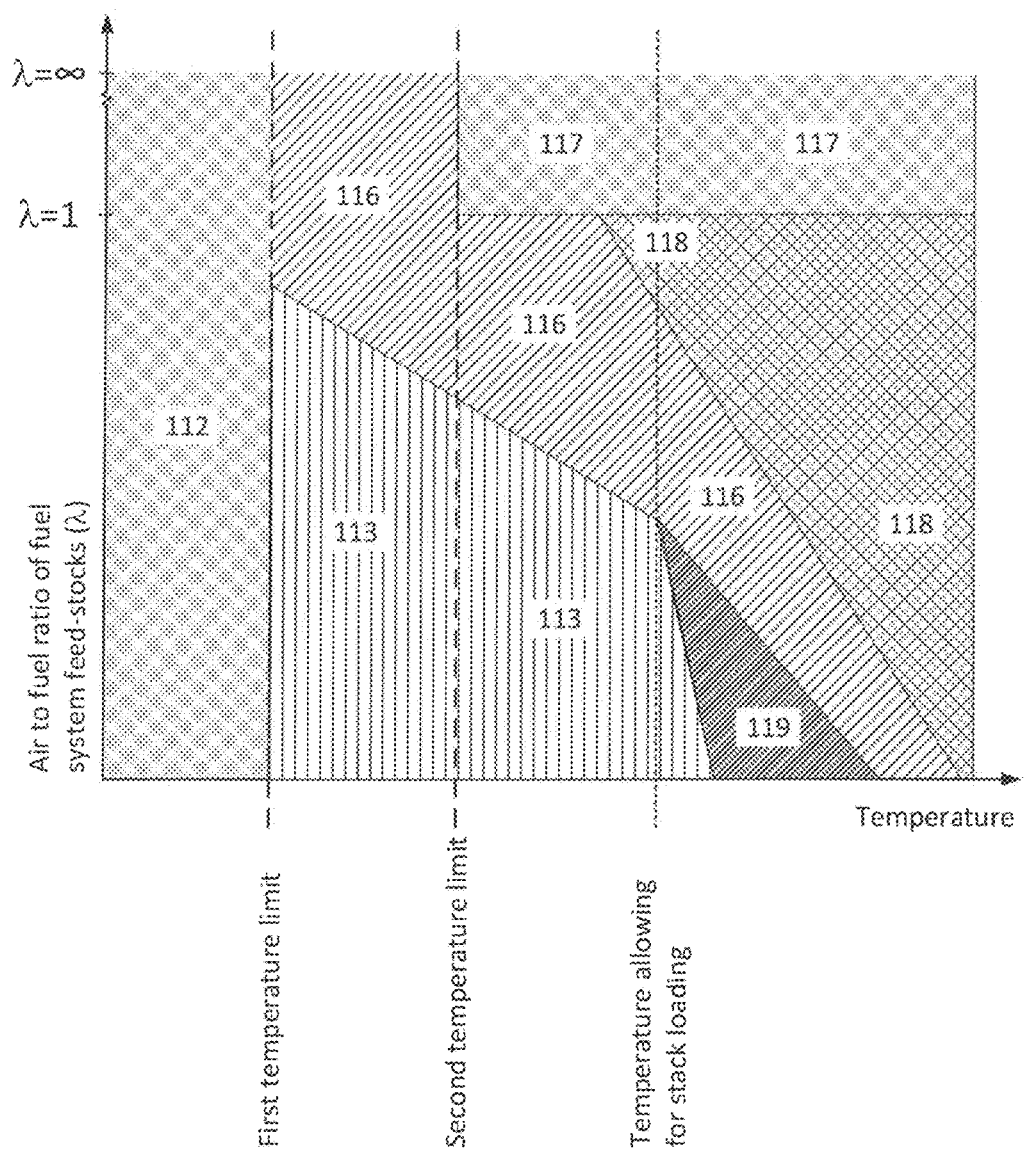
FIG. 3 shows pre-definition of first and second temperature limits.

FIG. 3 shows an exemplary schematic according to the present disclosure for specifying (i.e., pre-definition of) first and second temperature limits for determining window of operation for fuel feed control in transitions as well as safe operational area with respect to limiting air-to-fuel ratios causing excessive heat generation in CPOX-reformer reactor. λ represents air-to-fuel ratio of fuel cell system feed stocks which are fed to the fuel side of the system i.e. disregarding oxygen influx at the anodes. In the temperature area 112 below the first temperature limit carbonaceous species are precluded. Above the first temperature limit is safe operational area 116 for supplying carbonaceous gas species to the fuel cell system. Carbon deposition range 113 defines points of operation with fuel feed in which carbon deposition may occur. Above the second temperature limit is nickel (Ni) oxidation range 117. The third temperature limit is a temperature above which loading of the fuel cells is allowed, and start of loading also limits an oxygen influx area 119. An area of operation 118 in which reformer overheating could occur poses an upper limit for the feedstock A at higher stack temperatures. The safe operational area 116, which is limited to the first temperature limit, represents the area to the exemplary A values according to the present disclosure. The safe operational area extends over the second and third temperature limits as presented in the exemplary schematic of FIG. 3.

Figure 4:
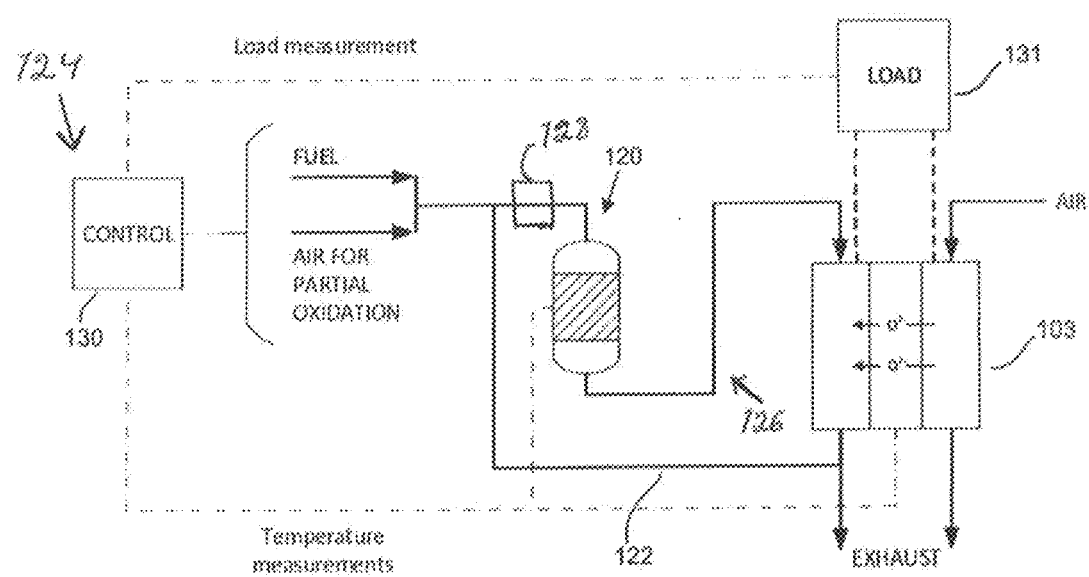
FIG. 4 shows an exemplary embodiment as disclosed herein.

FIG. 4 shows presented a schematic arrangement of a fuel cell system for controlling air-to-fuel ratio of fuel system feed-stocks based on temperature information from fuel cell stacks as well as reformer reactor during system transients across or within temperature ranges and accounting for oxygen influx through fuel cell stacks as a result of loading in overall oxygen-to-carbon ratio control. In the fuel cell system each fuel cell includes an anode side 100, a cathode side 102, and an electrolyte 104 between the anode side and the cathode side. The fuel cell system includes a catalytic element 120 for performing catalytic reactions, and means 122 for performing a recirculation in a recirculation loop containing at least the fuel cell anode sides 100 and the catalytic element 120 upstream of the fuel cells. The fuel cell system according to FIG. 4 includes predefined first and second temperature limits for the fuel cells 103 to be utilized in start-up transition process of the fuel cell system. The means 124 specifies a low temperature operating state of cells below the first limit, at which presence of carbonaceous species at the cells 103 is precluded, and a transition temperature range of cells above the first limit and below the second limit, at which fuel flow is supplied in a mixture with air to the fuel system, carried by anode tail gas recirculated at a recirculation rate over 70%. The means 124 further specifies an intermediate temperature operating state of the cells 103 above the second temperature limit, at which operation state free oxygen at the anode sides 100 is precluded. The first and second temperature limits can be predefined by the means 124 for predefining, which are for example a computer unit in which is performed modelling based on thermodynamic data. The first and second temperature limits can also be predefined experimentally or by some other means. Control of the fuel cell system according to the present disclosure is based on said temperature limits.

The fuel system of FIG. 4 also includes means 126 for facilitating and safeguarding reaction between supplied fuel and free oxygen upstream of the fuel cells whenever fuel is supplied. The means 126 for facilitating can be accomplished for example by temperature measurement devices such as thermocouples, an ignition source, a catalytic element and/or by means for heating a reactor above a reaction threshold temperature. The threshold temperature for the reactor may differ from the predefined temperature limits for the fuel cells. The means 126 for safeguarding can be accomplished for example by temperature sensors, gas sensors, and/or by ignition sensors. In an exemplary embodiment according to the present disclosure the means performs heating process of the fuel cells 103 with an air feed on the cathode sides 102.

The fuel cell system according to FIG. 4 includes for start-up transition a process means 128 for bringing temperature of the cells 103 in the system to transition temperature range to facilitate transitions between low and intermediate temperature operating states through the transition temperature range. The means 128 can be accomplished for example by heat exchangers 105 (FIG. 2), heaters and/or burners. The fuel cell system includes means 130 for controlling of oxygen to carbon ratio of fluid at the anode sides of cells based on predefined temperature dependent boundary values by adjustment of air to fuel ratio $\lambda$ of feed stocks above $0.55\lambda$ at transition temperature range and controlling the $\lambda$ of feed stocks based on temperature information in the intermediate temperature range. The means 130 further reduces $\lambda$ when loading is applied to the fuel cells to compensate for oxygen influx through the cells to the anode sides of the cells and to control fuel utilization. In an exemplary embodiment according to the present disclosusre the fuel cell system can includes means 130 for controlling air to fuel ratio and total feedstock volume flow based on supplying sufficient amount of hydrogen species to the fuel cells 103, avoiding deposition of solid carbon at the fuel cells, and for maintaining the recirculation loop feed-in volume flow above a predefined level. The means 130 can be accomplished for example by flow controllers, control valves or the like as well as instrumentation means combined with thermodynamic models or precalculated values for determining relevant operational limits. By the means 124, 126, 128, 130 according to the present disclosure can be performed reforming reactions independently of separate heat transfer operations (e.g., active heating or cooling means may not be needed in order to have effect on reformer temperature conditions due to lower $\lambda$ values of feed stocks). It may however in some cases be advantageous to include for example, a preferably passive heat exchange element or structure facilitating heat transfer between fuel cell temperature levels and anode inlet flow to limit the temperature difference between anode inlet flow and fuel cell temperatures.

In order to avoid formation of harmful carbon compounds as well as for avoiding anode oxidation, sufficient margins in the control of feed stocks can be applied with respect to theoretical limiting values to allow for inaccuracies in the feed stock flows as well and in other instrumentation data. These inaccuracies may be dependent on the operating state, such as for example, the relative error of a fuel feed controller. In a preferred embodiment of the invention the state-dependent inaccuracy is continuously taken into account in the control and definition of safe operating area rather than using fixed margins, whereby margins are never unnecessarily high or low and system performance is optimized. Multiple simultaneous means for example, determining magnitude of flows such as flow measurements, characterized pressure drops, heat capacity and heat generation at reformer may be used to minimize the uncertainty in feed stock flows and hence lambda.

The control means may choose an optimal point at the temperature dependent boundary of the safe operation area or from between the boundaries of the safe operating area to optimize the thermal balance of the system. For example during heat-up or partial load it may be advantageous to operate at a higher than minimum lambda and maximum fuel utilization to increase the amount of heat delivered to the system. On the other hand at high temperatures in the system and during system shutdown, it may be advantageous to operate below a thermodynamic carbon formation limit in the reformer as long as the safe operating area for the fuel cells is not violated. In relation to initiation of fuel feed it may be advantageous to remove any initial free oxygen in the anode loop by purging it for a short duration with an inert or reducing gas. Similarly after termination of fuel feed in shutdown, carbonaceous species can be displaced from the anode loop by air or a purge gas.

In an exemplary embodiment according to the present disclosure the fuel cell system includes means 138 for performing initiation of loading of the fuel cells and ramping up the current while simultaneously further reducing the air-to-fuel ratio of feed stocks below 0.1 before reaching 70%-85% of a nominal load. For example, the air-to-fuel ratio of feed stocks is reduced to zero at near nominal-conditions to completely avoid partial oxidation, thus optimizing the performance of the system and also reformer lifetime. Reduction of the air-to-fuel ration is, for example, based on a stack current information and anode recirculation flow information based on which the amount of steam being recirculated to the fuel feed can be determined.

The fuel cell system according to FIG. 4 includes for shutdown transition a process means 130 for controlling of oxygen to carbon ratio of fluid at the anode sides of cells based on predefined temperature dependent boundary values by adjustment of air to fuel ratio λ of feed stocks above 0.55λ at transition temperature range and for controlling the λ based on temperature information in the intermediate temperature range. The means 130 can further increase λ when fuel cell loading 131 is decreased to compensate for reduced oxygen influx through the cells to the anode sides of the cells and to control fuel utilization. In the shutdown transition process can be utilized same means for performing fuel cell system operations than described related to the start-up transition a process. The first and second temperature limits described related to start-up and shutdown transition processes are both between 200° C. and 400° C. For example, the first temperature limit could be 250° C. to provide a reasonable safety margin with respect to carbonyl formation.

In the shutdown transition process the process steps are performed in different order than in the start-up transition process: λ is further increased when fuel cell loading is decreased to compensate for decreased oxygen influx through the cells to the anode sides of the cells and to control fuel utilization, oxygen to carbon ratio of fluid at the anode sides of cells is controlled based on predefined temperature dependent boundary values by adjustment of air to fuel ratio λ of feed stocks above 0.55λ at transition temperature range and controlling the λ based on temperature information in the intermediate temperature range, bringing temperature of the cells in the system to transition temperature range to facilitate transitions between low and intermediate temperature operating states through the transition temperature range, and facilitating and safeguarding reaction between fuel and free oxygen supplied at the catalytic element whenever fuel is supplied. It may be desirable or necessary to remove heat from the anode inlet flow prior to entering the fuel cells to be able to bring the fuel cell temperatures down to the transition temperature range with λ of feed stocks above 0.55 prior to achieving this range.

In the fuel cell system according to FIG. 4 for a start-up or shut-down transition process is further presented means 134 for suspending heating or cooling process to facilitate a safe system hot idling state and to facilitate a subsequent option for reversal process direction. Electrical heaters, burners and heat exhangers combined with cathode and anode flow control is utilized to keep the process at essentially steady temperatures. A hot idling state may be entered for example during certain overhaul operations, as a safety precaution in case of certain system abnormalities or as a waiting state in case of loss of external load.

Anode recirculation may be accomplished by a recirculation blower or a steam or fuel driven ejector. In an exemplary embodiment according to the present disclosure the fuel cell system can include at least one ejector 140 for performing repressurization facilitating circulation in the recirculation loop.

Although embodiments have been presented with reference to the attached figures and specification, the invention is by no means limited to those embodiments.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for start-up transition of a fuel cell system operation state, in which system each fuel cell includes an anode side, a cathode side, and an electrolyte between the anode side, the method comprising:
    performing a recirculation in a recirculation loop containing at least the fuel cell anodes and a catalytic element upstream of the fuel cells;
    specifying first and second temperature limits for the fuel cells, with a low temperature operating state of cells being below the first limit at which presence of carbonaceous species at the cells is precluded, a transition temperature range of cells above the first limits and below the second limit at which fuel flow supply is initiated to the fuel cell system in a mixture with air, combined with anode tail gas recirculated at a recirculation rate over 70%, the recirculation being at least partly supported by ejector facilitated repressurization operations, and an intermediate temperature operating state of the cells above the second temperature limit at which free oxygen at the anodes is precluded;
    bringing a temperature of the cells in the system to the transition temperature range to facilitate transitions between low and intermediate temperature operating states through the transition temperature range;
    facilitating and safeguarding reaction between fuel and free oxygen supplied at the catalytic element whenever fuel is supplied; and
    controlling an oxygen to carbon ratio of fluid at the anode sides of cells based on predefined temperature dependent boundary values by adjustment of an air to fuel ratio λ of feed stocks above 0.55*λ at the transition temperature range and controlling the λ of the feed stocks based on temperature information in the intermediate temperature range and further reducing λ of the feed stocks when a loading is applied to the fuel cells to compensate for oxygen influx through the cells to the anode sides of the cells and to control fuel utilization.

2. A method for shutdown transition process of a fuel cell system operation state, in which system each fuel cell includes an anode side, a cathode side, and an electrolyte between the anode side and the cathode side, the method comprising:

performing a recirculation loop containing at least the fuel cell anodes and a catalytic element upstream of the fuel cells;

specifying first and second temperature limits for the fuel cells, with a low temperature operating state of cells below the first limit at which presence of carbonaceous species at the cells is precluded, a transition temperature range of cells above the first limit and below the second limit, at which fuel supply to the fuel cell system is terminated in a mixture with air, combined with anode tail gas recirculated at a recirculation rate over 70%, the recirculation being at least partly supported by ejector facilitated repressurization operations, and an intermediate temperature operating state of the cells above the second temperature limit at which free oxygen at the anodes is precluded;

facilitating and safeguarding a reaction between fuel and free oxygen supplied at the catalytic element whenever fuel is supplied;

bringing a temperature of the cells in the system to the transition temperature range to facilitate transitions between low and intermediate temperature operating states through the transition temperature range; and controlling an oxygen to carbon ratio of fluid at the anode sides of cells based on predefined temperature dependent boundary values by adjustment of an air to fuel ratio $\lambda$ of feed stocks above $0.55*\lambda$ at the transition temperature range, and controlling the $\lambda$ of feed stocks based on temperature information in the intermediate temperature range and further increasing $\lambda$ of feed stocks when fuel cell loading is decreased to compensate for oxygen influx through the cells to the anode sides of the cells and to control fuel utilization.

3. The method in accordance with claim 1, comprising:
suspending the transition process heating or cooling process to facilitate a safe system hot idling state and to facilitate a subsequent option for process direction reversal.

4. The method in accordance with claim 1, wherein the first and second temperature limits are both between 200° C. and 400° C.

5. The method in accordance with claim 1, comprising:
heating of the fuel cells with heat applied on the cathode side.

6. The method in accordance with claim 1, comprising:
initiating loading of the fuel cells and ramping up the current while simultaneously further reducing the air-to-fuel ratio of fuel cell system feed stocks below 0.1 before reaching 70%-85% of a nominal load.

7. The method in accordance with claim 1, comprising:
controlling the air to fuel ratio and total volume flow based on supplying sufficient amount of hydrogen species to the fuel cells, avoiding deposition of solid carbon at the fuel cells, and maintaining the recirculation loop feed-in volume flow above a predefined level.

8. The method in accordance with claim 1, comprising:
transferring heat between the anode inlet flow and fuel cell temperature levels.

9. The method in accordance with claim 2, comprising:
suspending the transition process heating or cooling process to facilitate a safe system hot idling state and to facilitate a subsequent option for process direction reversal.

10. The method in accordance with claim 2, wherein the first and second temperature limits are both between 200° C. and 400° C.

11. The method in accordance with claim 2, comprising:
controlling the air to fuel ratio and total volume flow based on supplying sufficient amount of hydrogen species to the fuel cells, avoiding deposition of solid carbon at the fuel cells, and maintaining the recirculation loop feed-in volume flow above a predefined level.

12. The method in accordance with claim 2, comprising:
transferring heat between the anode inlet flow and fuel cell temperature levels.

* * * * *